Jan. 15, 1924. 1,481,124
C. F. COWDREY
BRAKE TESTING DEVICE FOR VEHICLE WHEELS
Filed Oct. 24, 1922 2 Sheets-Sheet 2
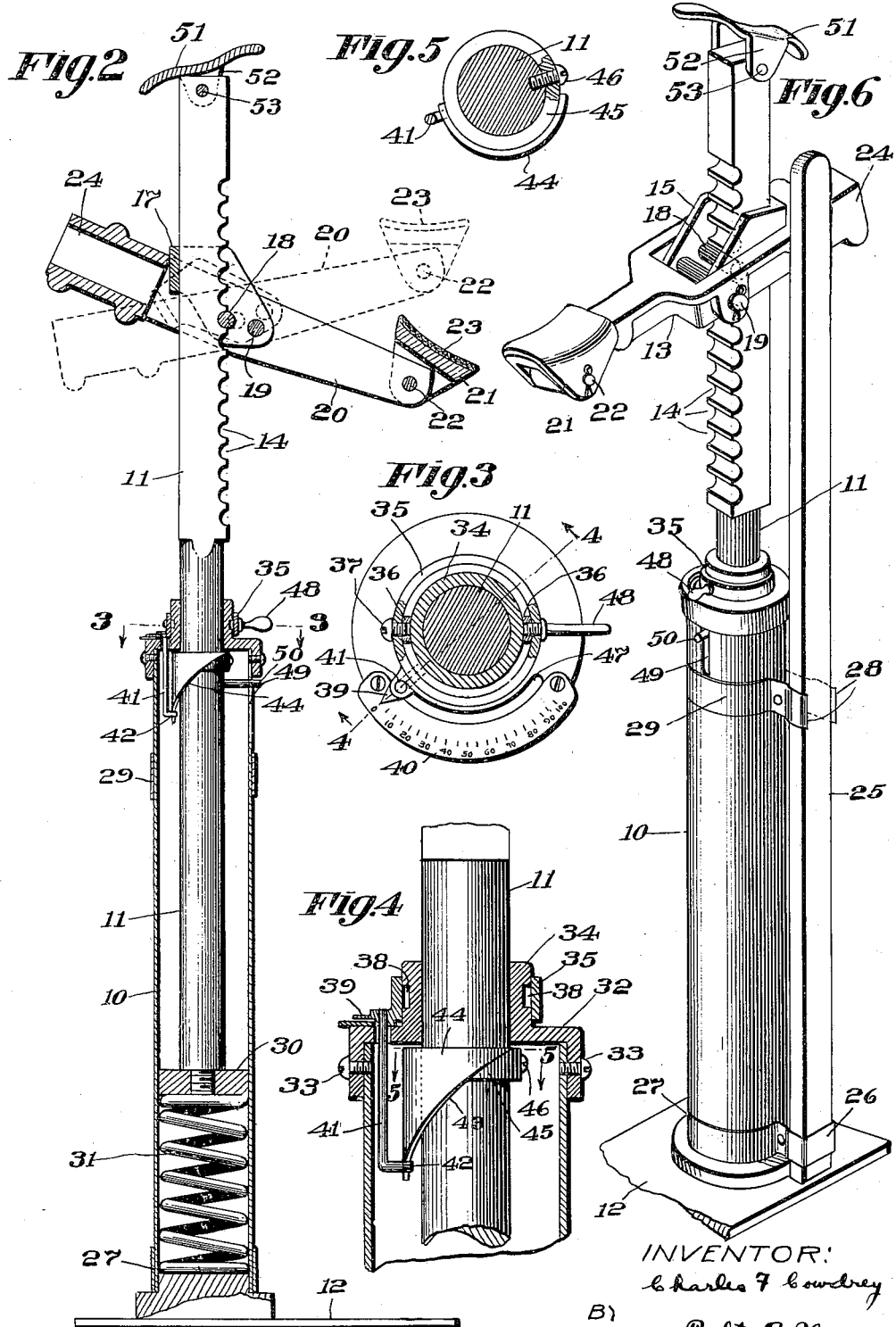
INVENTOR:
Charles F. Cowdrey
BY
Robt. P. Harris
ATTORNEY Patented Jan. 15, 1924.

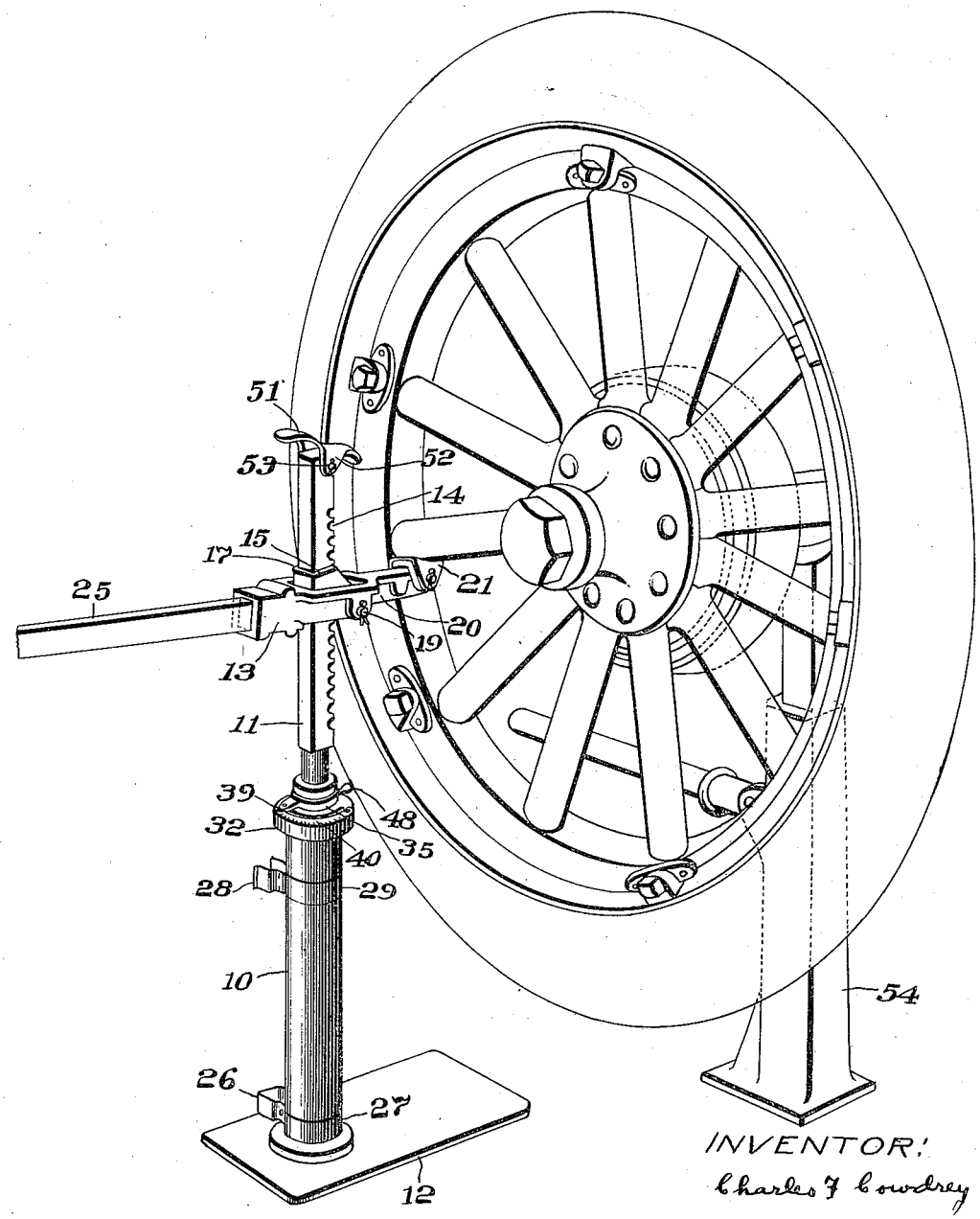

1,481,124

UNITED STATES PATENT OFFICE.

CHARLES F. COWDREY, OF FITCHBURG, MASSACHUSETTS.

BRAKE-TESTING DEVICE FOR VEHICLE WHEELS.

Application filed October 24, 1922. Serial No. 596,584.

*To all whom it may concern:*

Be it known that I, CHARLES F. COWDREY, a citizen of the United States, residing at Fitchburg, in the county of Worcester and State of Massachusetts, have invented an Improvement in Brake-Testing Devices for Vehicle Wheels, of which the following description, in connection with the accompanying drawings, is a specification, like characters on the drawings representing like parts.

This invention relates to means for testing the action of a brake upon the wheels of an automobile or other vehicle, in order that any inequality in the brake action may be readily equalized and made uniform.

Unless the action of the brake upon the wheels of a vehicle at opposite sides thereof is the same or substantially so, the movement of the vehicle on application of the brake is liable to cause the vehicle itself to swerve from its direct path of movement, due to the wheel on one side of the vehicle exerting a greater retarding force than the wheel upon the opposite side of the vehicle. Such inequality in the brake action at opposite sides of the vehicle is one of the important factors that enters into many of the accidents which are now prevalent, more especially in automobile travel.

Where, as in the usual automobile construction, relative rotation is permitted between the rear wheels of the automobile by the differential gearing, any inequality of the brake action upon the wheels at the opposite sides of the automobile is liable to cause the automobile to swerve from the desired path of travel with resulting danger or accident. These facts are recognized in the automobile industry, and equalization of brake action on the wheels at opposite sides of the automobile is sought by hand adjustment of the brakes. Such hand adjustment without means for comparing the actions of the brake upon each wheel, is guesswork, and in most instances the brakes do not act with equal retarding effect upon the wheels at the opposite sides of the automobile.

In testing the action of a brake upon the wheels of a vehicle, the test should be made while the brake is applied with substantial force, because the harder the brake is applied to check the speed of the vehicle, the more important it is that the brake should act upon the wheels equally. Heretofore in adjusting brakes it has been customary to turn the wheels by hand while the brake is applied, to estimate the braking effect, but obviously the wheels cannot be turned by hand to estimate the brake action when the brake is applied hard.

Having the above matter in mind, one of the features of the present invention consists in portable means that is simple in construction, and is adapted to be engaged with a wheel of a vehicle to turn the same under various brake resistance.

Another feature of the invention consists in novel means for indicating the force applied to a wheel to turn it under brake resistance.

The above and other features of the invention and novel combination of parts will be hereinafter described in connection with the accompanying drawings which show one good, practical form of the invention.

In the drawings:

Fig. 1 is a perspective view of a rear wheel of an automobile showing the present invention associated therewith;

Fig. 2 is an enlarged vertical sectional view through the brake testing device of Fig. 1;

Fig. 3 is an enlarged sectional view taken on the line 3—3 of Fig. 2;

Fig. 4 is a vertical sectional view taken on the line 4—4 of Fig. 3;

Fig. 5 is a sectional view taken on the line 5—5 of Fig. 4; and

Fig. 6 is an enlarged perspective view of the opposite side of the brake testing device of Fig. 1.

In the embodiment of the invention illustrated in the drawings, a support 10 is provided which serves to hold a post 11 in upright position, and the support 10 preferably has a wide base 12 adapted to rest firmly on the ground or floor. In the present case the post 11 is adapted to support a rocking lever 13 at any one of a number of different heights from the ground.

Various constructions may be provided for permitting adjustment of the lever 13 lengthwise of the post 11 for supporting the lever at any desired position lengthwise of the post, and in the present case one face of the post 11 is provided with a series of notches 14 arranged lengthwise thereof, and a bracket 15 is provided which is adapted to surround the post and slidably engage the same. The bracket 15, as will be apparent from Figs. 2 and 6, has a rear wall 17 which is adapted to rest firmly against the rear face of the post 11, and the bracket is provided with a transversely extending pin 18 that is adapted to rest in any one of the notches 14, the construction is such that the pin 18 may be forced into engagement with a notch by forcing the outer end of the bracket downwardly, as shown in full lines in Fig. 2, and the pin may be moved out of engagement with the notches by tilting the bracket 17 to the position shown in dotted lines in Fig. 2.

The lever 13 has an opening formed therethrough of sufficient size to receive the bracket 15 therein, and a pin 19 extending through the lever 13 and through the outer spaced ends of the bracket 15 serves to pivotally secure the lever to the bracket. It will be noted that the pivoted pin 19 is spaced outwardly from the notch engaging pin 18 so that downward pressure exerted upon the bracket 15 by the lever serves to force the pin 18 into firm engagement with a notch 14.

The pivoted lever 13 serves to exert a turning force upon a wheel, the brake action upon which is to be tested, and to this end the lever has an arm 20 of sufficient length to extend under a spoke of a wheel when the brake testing device is positioned to one side of the wheel, as shown in Fig. 1, and the outer end of the arm 20 may be provided with a saddle 21, the upper face of which is curved, as shown, to engage the rounded surface of a spoke, and this saddle preferably is pivotally secured to the arm by a pin 22 so that the arm may be forced upwardly to different inclinations as shown in Fig. 2, while the saddle remains in firm engagement with a spoke, and if desired, the upper face of the saddle may be covered with leather or other soft material 23 that will prevent the surface of the spoke from being marred. Should it be desired to use the testing device in connection with disk or wire wheels, the saddle 21 may be replaced by means better adapted to engage such wheels to exert a turning force upon the same.

The lever 13 preferably is rocked manually to exert a turning force upon a wheel, and to this end, in the construction shown, the lever 13 has a socket 24 which is adapted to receive an operating bar 25 of any desired length. This construction enables the bar 25 to be disengaged from the lever when a test is not being made, so that the lever will not have a long protruding bar except when the lever is being actuated. When the bar 25 is not in use it may be supported in a vertical position alongside of the support 10, as shown in Fig. 6, and to this end, one end of the lever may be inserted in a socket 26 formed by a strap 27 which embraces the lower portion of the support, and the intermediate portion of the lever may be engaged by spaced resilient jaws 28 extending outwardly from a strap 29 which embraces the support 10. The lever 13 as above pointed out may be supported at different points lengthwise of the post 11 so that the arm 20 of his lever may be placed properly under the spoke to be engaged, irrespective of the size of the wheel or the height of this particular spoke from the ground.

It is important that means be provided for indicating the force required to turn a wheel under the holding action of the brake, and simple means to this end will now be described. In the construction shown, the support 10 is in the form of a hollow tube in which the lower end of the post 11 is slidably mounted. The post may have an enlarged lower end 30 which slidably engages the inner walls of the support 10 and this enlarged end rests on a coiled spring 31 mounted in the lower portion of the support, the arrangement being such that the post 11 will yield downwardly as the downward pressure upon the same is increased. The upper end of the tubular support 10 is conveniently provided with a collar 32 which may embrace the upper end of the support, as shown, and may be secured thereto by screws 33, and this collar may be provided with a reduced neck 34 which slidably receives an intermediate portion of the post 11.

Since the extent to which the post 11 will move downwardly varies with the downward pressure exerted upon the same, the turning force exerted upon a wheel may be determined by indicating the downward movement imparted to the post 11. Various types of indicators to this end may be provided but it is desirable that such indicator be so constructed that it may be easily read by a person standing near the testing device and looking down upon the indicator, without the necessity of stooping down or leaning over to an uncomfortable position, and it is also important that the indicator be so constructed and positioned that it is not likely to be damaged by the brake testing device being knocked over or otherwise misused. The indicating device disclosed consists of a ring 35 which is rotatably mounted about the neck 34 and is preferably held from movement lengthwise of this neck by shoes 36 secured to the ring by one or more screws 37 and these shoes fit in an annular groove 38 formed about the neck 34. The ring 35 has a pointer 39 which travels over a graduated dial 40 secured to the collar 32, as shown, the construction being such that as the ring 35 is rotated the pointer will travel over the graduated dial 40. Rotative movement is imparted to the ring 35 by providing the same with a downwardly extending rod 41 having an inwardly extending portion 42 at its lower end which is adapted to engage the steep cam face 43 of a curved plate 44 carried by the post 11. In the present case the plate 44 is rigidly secured to a ring 45 which embraces the post 11 and is secured thereto by one or more screws 46. The collar 32 has an arc shaped slot 47 formed therethrough through which the rod 41 extends. The construction is such that as the post 11 yields downwardly under pressure, the cam face 43 will act upon the laterally extending portion 42 of the rod 41, and since this cam face has a steep inclination, as shown in Fig. 4, it will swing the rod 41 and ring 35 through an arc the length of which depends upon the extent to which the post 11 is depressed, and as the pressure upon the post is relieved the latter will move upwardly to its normal elevated position while the indicator 39 will remain in the position to which it was turned and will indicate the maximum reading. After this reading has been noted, the pointer 39 may be turned manually to the zero position by engaging a handle 48 extending outwardly from the ring 35, and as a result of this construction the indicator, as just stated, will remain in the position to which it was turned by the downward movement of the post 11 to record the maximum downward pressure upon the post. When an indicator of the type just described is used with the present device it is important that the post 11 be prevented from rotating within the hollow support 10 and this may be accomplished by providing a vertical slot 49 within a wall of the support 10 in which a pin 50 extending outwardly from the post may slide, as will be apparent from Figs. 2 and 6. A handle 51 of any desired form may be secured to the upper end of the post 11 so that the testing device may be readily carried from place to place, and in the construction shown this handle is formed with downwardly extending ears 52 which are pivotally secured to the upper end of the post by a pin 53.

It is desirable that the wheel being tested be relieved from the weight of the vehicle during the testing operation and any suitable jack 54 may therefore be provided to support the wheel out of engagement with the ground while the action of the brake upon the wheel is being tested.

What is claimed is:

1. A brake tester for testing the brake resistance to the turning movement of vehicle wheels, comprising, in combination, a support, a post mounted upon the support for yielding downward movement, a bracket adjustably mounted upon the post and constructed to be supported thereby at different elevations from the ground, a lever pivotally mounted upon the bracket and operable to exert a turning force upon a wheel to turn the wheel under brake resistance, and means actuated by the yielding downward movement of the post to indicate the force required to effect turning movement of the wheel.

2. A brake tester for testing the brake resistance to the turning movement of vehicle wheels, comprising, in combination, a post supported in an upright position, a bracket mounted upon the post for adjustment longitudinally thereof and having surfaces movable into gripping engagement with the post, a lever pivotally mounted upon the bracket so that the downward pressure of the former upon the latter holds the bracket in firm gripping engagement with the post, means upon the lever engageable with a wheel to exert a turning force upon the wheel as the lever is rocked, and means for indicating the force required to effect turning movement of the wheel.

3. A brake tester for testing the brake resistance to the turning movement of vehicle wheels, comprising, in combination, a support, a post mounted upon the support for yielding downward movement, a lever adjustable lengthwise of the post and having post embracing means for supporting the lever at different elevations from the ground, means upon the lever engageable with a wheel to exert a turning force upon the wheel as the lever is rocked, a lever operating bar engageable with the lever to rock it, and means for indicating the force required to effect turning movement of the wheel.

4. A brake tester for testing the brake resistance to the turning movement of vehicle wheels, comprising, in combination, a support, a post held in an upright position by the support, a lever adjustable lengthwise of the post and adapted to be supported by the post at different elevations from the ground, means upon the lever engageable with a wheel to exert a turning force upon the wheel as the lever is rocked, a lever operating bar engageable with the lever to rock it and removable from the lever when not in use, and means for indicating the force required to effect turning movement of the wheel.

5. A brake tester for testing the brake resistance to the turning movement of vehicle wheels, comprising, in combination, a support, a post mounted upon the support for yielding downward movement, a lever rockingly supported by the post and operable to exert a turning force upon a wheel, an indicator mounted at the upper end of the support to swing in a horizontal plane, and means for imparting the downward yielding movement of the post to the indicator to rock the latter to a position to indicate the force required to effect turning movement of the wheel.

6. A brake tester for testing the brake resistance to the turning movement of vehicle wheels, comprising, in combination, a support, a post mounted upon the support for yielding downward movement, a lever rockingly supported by the post and operable to exert a lifting force upon a wheel to turn it under brake resistance, an indicator mounted upon the support to swing in a horizontal plane, and means for imparting the downward yielding movement of the post to the indicator to swing the latter laterally to a position to indicate the force required to effect turning movement of the wheel.

7. A brake tester for testing the brake resistance to the turning movement of vehicle wheels, comprising, in combination, a support, a post mounted upon the support for yielding downward movement, a lever rockingly supported by the post and operable to exert a lifting force upon a wheel to turn it under brake resistance, an indicator mounted upon the support to swing in a horizontal plane, and cam means upon the post for imparting rocking movement to the indicator as the post yields downwardly under the lever pressure.

8. A brake tester for testing the brake resistance to the turning movement of vehicle wheels, comprising, in combination, a support, a post mounted upon the support for yielding downward movement, a lever rockingly supported by the post and operable to exert a lifting force upon a wheel to turn it under brake resistance, an indicator mounted upon the support to swing in a horizontal plane, cam means actuated by the post for imparting rocking movement to the indicator as the post yields downwardly under the lever pressure, and manually engageable means for restoring the indicator to the zero position.

9. A brake tester for testing the brake resistance to the turning movement of vehicle wheels, comprising, in combination, a support, a post mounted upon the support for yielding downward movement, an arm extending from said post and having wheel engaging means, means for imparting a lifting movement to the arm to exert a turning force upon the wheel, an indicator mounted upon the support to swing in a horizontal plane, and means actuated by the post for imparting swinging movement to the indicator as the post yields downwardly under the reaction of said arm.

10. A brake tester for testing the brake resistance to the turning movement of vehicle wheels, comprising, in combination, a support, a post mounted upon the support for yielding downward movement, an arm extending from said post and having wheel engaging means, means for imparting a lifting movement to the arm to exert a turning force upon the wheel, an indicator mounted upon the support to move in a horizontal plane, and cam means operable by the post upon downward yielding movement of the post to move the indicator horizontally.

In testimony whereof, I have signed my name to this specification.

CHARLES F. COWDREY.